US011113977B2

(12) United States Patent
Stanley (10) Patent No.: US 11,113,977 B2
(45) Date of Patent: Sep. 7, 2021

(54) RUNWAY OBSTACLE CLEARANCE DEVICE AND METHOD

(71) Applicant: Melvin C. Stanley, Port Orange, FL (US)

(72) Inventor: Melvin C. Stanley, Port Orange, FL (US)

(*) Notice: Subject to any disclaimer, the term of this patent is extended or adjusted under 35 U.S.C. 154(b) by 0 days.

(21) Appl. No.: 16/832,604

(22) Filed: Mar. 27, 2020

(65) Prior Publication Data

US 2020/0312166 A1 Oct. 1, 2020

Related U.S. Application Data

(60) Provisional application No. 62/826,656, filed on Mar. 29, 2019.

(51) Int. Cl.
*G01C 5/00* (2006.01)
*G08G 5/00* (2006.01)
*B64F 1/36* (2017.01)

(52) U.S. Cl.
CPC .............. *G08G 5/0086* (2013.01); *B64F 1/36* (2013.01)

(58) Field of Classification Search
None
See application file for complete search history.

(56) References Cited

U.S. PATENT DOCUMENTS

| 8,718,915 | B1* | 5/2014 | Turcios | G08G 5/0086 701/448 |
| 2013/0155397 | A1* | 6/2013 | Kumagai | G01D 5/3473 356/138 |
| 2014/0190025 | A1* | 7/2014 | Giger | G01C 15/002 33/228 |
| 2016/0076885 | A1* | 3/2016 | Nishita | G01C 5/00 33/292 |

OTHER PUBLICATIONS

Article No. 1 attached: U.S. Department of Transportation Federal Aviation Administration entitled: United States Standard for Terminal Instrument Procedures (TERPS).
Article No. 2 attached: CFR Title 14, Chapter 1, Subchapter E, Part 77 entitled: Safe, Efficient Use, and Preservation of the Navigable Airspace.

* cited by examiner

*Primary Examiner* — Brent Swarthout
(74) *Attorney, Agent, or Firm* — Lewis Anten, Esq.

(57) ABSTRACT

The present invention is designed to instrumentation and methods for providing runway obstacle clearance for instrument and non-instrument landing of an aircraft. The device provides a simple method of determining if there are any obstacles within the FAA required path of landing of an aircraft. Typically, there are trees and other obstacles which have to be precisely located to determine if such trees and other obstacles are within the required clearance space for permitted landing of an aircraft. This is particularly important when visual verification of the landing of the aircraft is required.

8 Claims, 10 Drawing Sheets

RUNWAY OBSTACLE CLEARANCE DEVICE AND METHOD

The present invention is for instrumentation and method for providing runway obstacle clearance for instrument and non-instrument landing of an aircraft. The device provides a simple method of determining if there are any obstacles within the FAA required path of landing of an aircraft. Typically, there are trees and other obstacles which have to be precisely located to determine if such trees and other obstacles are within the required clearance space for permitted landing of an aircraft. This is particularly important when visual verification of the landing of the aircraft is required.

BACKGROUND

All runway approaches for Part 77 runway design criteria, VFR runways, FAA United States Standard for Terminal Instrument Procedures (TERPS) for IFR non-precision and precision approaches require Obstacle Clearance Surfaces (OCS) or safety envelopes.

As referred to in the FAA National Policy Subj: United States Standard for Terminal Instrument Procedure (TERPS), and CFR Title 14, Chapter I, Subchapter E Part 17-Safe Efficient Use, and Preservation of the Navigable Airspace (both of which were referred to in the Information Disclosure Statement by Applicant and incorporated by reference) there are specific requirements for providing an obstacle clear space for the landing of aircraft. The above documents set forth these requirements. The currently available devices and methods of assuring the clear space is time consuming and expensive. The present method for determining the clear space required for landing requires the determination of the location of all the obstacles that might be in the clear space envelope required. This is expensive and time consuming.

The present invention is for both a different process and one example of hardware to make use of that process to verify that the required OCS planes are clear of obstructions. The different process is to provide a method to verify that the applicable OCS is clear of obstructions other than by surveying every obstacle under the OCS footprint to determine that each obstacle does not penetrate the OCS planes, as is currently done. Those surveys can and do easily reach into costing six figures. It is mandatory that the TERPS OCSs are certified to be clear in order to maintain FAA night authorization for any instrument approach. Strict enforcement by the FAA was prompted by accidents where it was determined that obstacles (trees) penetrating the OCS caused the accidents during night approach. The result was cancellation of night authorization for any approach with penetrations into the OCS. Hundreds of airports were affected and lost night authorization for their approaches. Most have not regained night authorization because of the expense related to clearing the obstacles (almost always trees) and verifying the OCS clear. The survey costs are often greater than that of the tree trimming or removal.

The FAA has embarked on a major program to have all airports clear the approach OCSs, especially of trees. The FAA takes the position that obstructions below the OCS are of no concern to the FAA. However, the only way currently available to verify the OCS clear is to survey every obstacle under the OCS foot print to verify that it does not penetrate. The present invention provides a reliable, accurate and relatively inexpensive method to sweep the base of the OCS planes to detect any penetrations, as well as an easy, simple way to visually direct a maintenance crew to any penetrations in order to mark and/or remove them and to immediately verify that the OCS is clear after any work is performed.

SUMMARY OF THE INVENTION

The present invention uses, for the most part, commercially available components that have been long accepted in the industry for their reasonable cost and reliability in the outdoor environment. The additional elements not commercially available are simple to manufacture and have no moving parts in and of themselves making the assembled product reliable and easy to assemble. The device has a wedge shaped element that offsets the usual horizontal orientation of a surveying instrument so that the line of sight of the surveying instrument relative to the earth, now cuts a selected plane as viewed through the surveying equipment comparable to the clear space required by a landing aircraft. To determine if the flight path of an airplane and the side clearances are clear of obstacles for landing, the device of the present invention is rotated about its central axis and the user looks through the sighting mechanism to determine if any obstacles are in the line of sight of the sighting mechanism.

DESCRIPTION OF THE INVENTION

Figure 1:
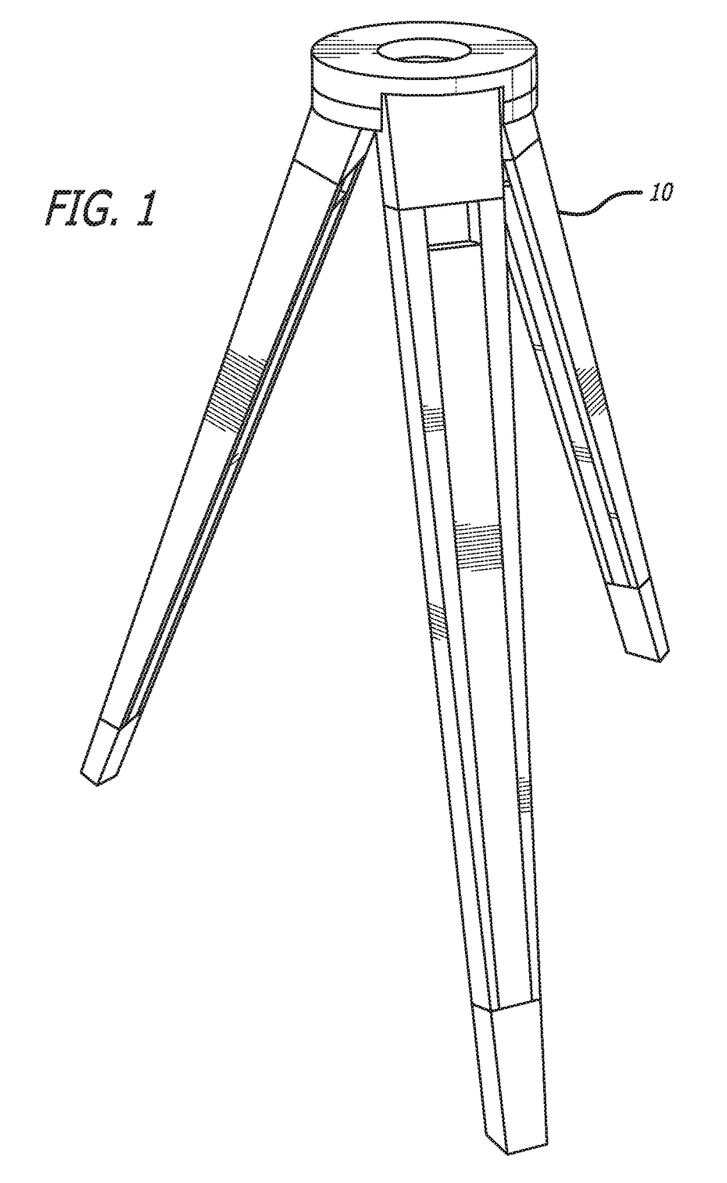
Figure 2:
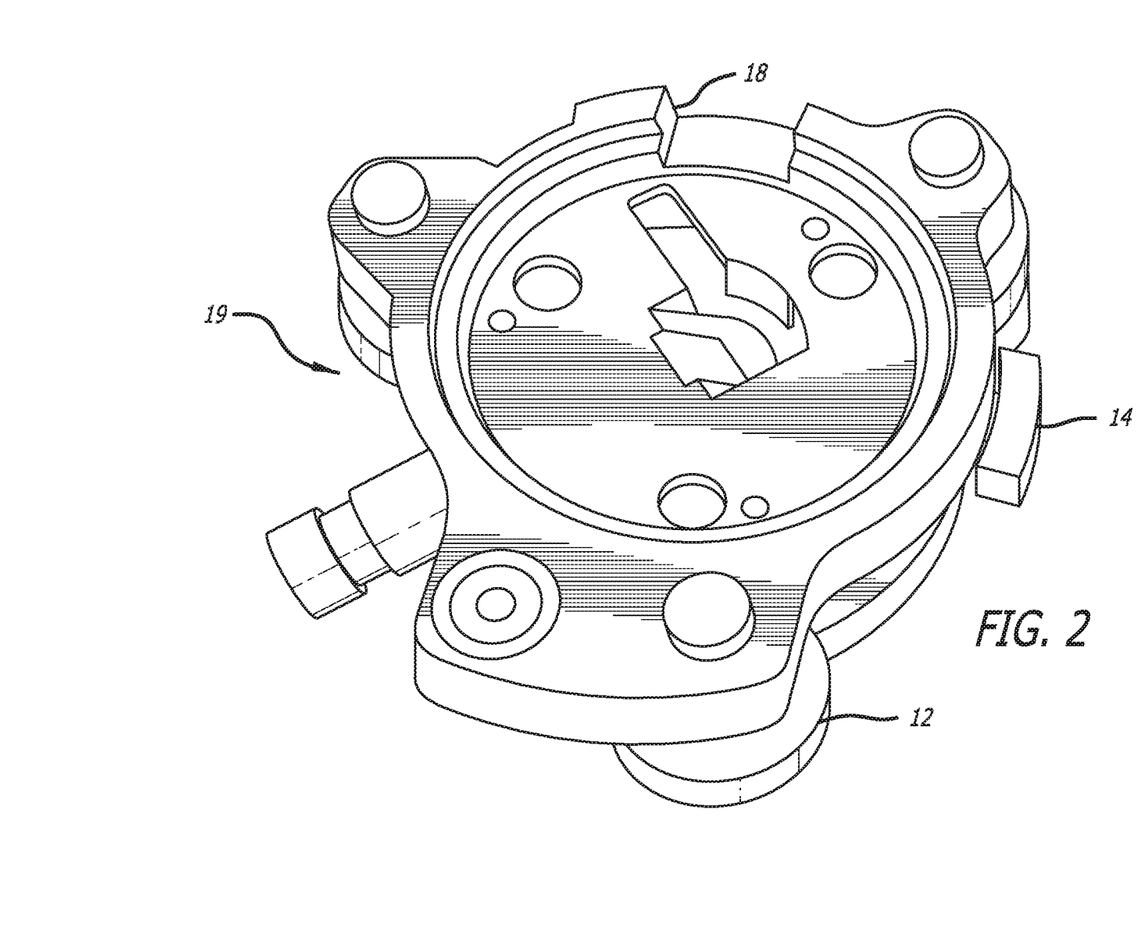
FIG. 2 is the base which can be adjusted to level with the earth and attachable to a tripod or other platform.
Figure 3:
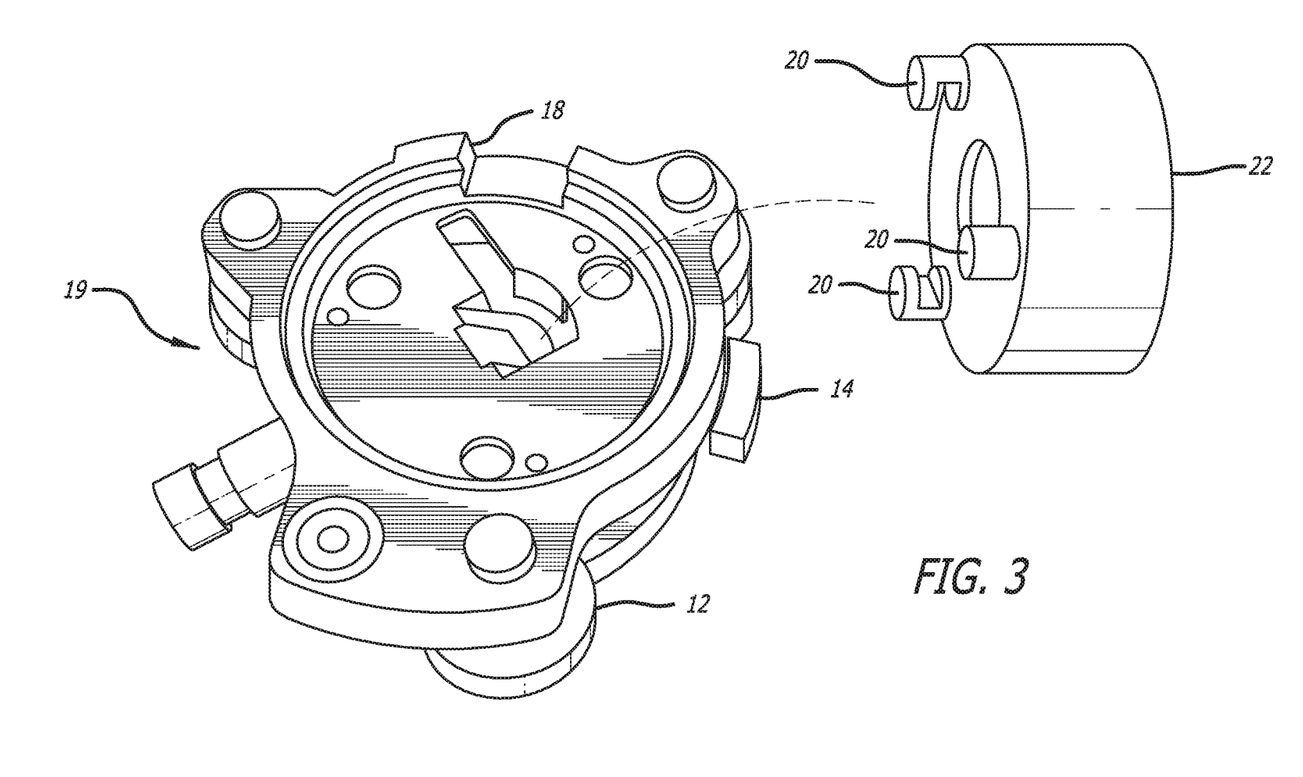
FIG. 3 is the item in FIG. 2 with a rotating base attachable to the item in FIG. 2.
Figure 4:
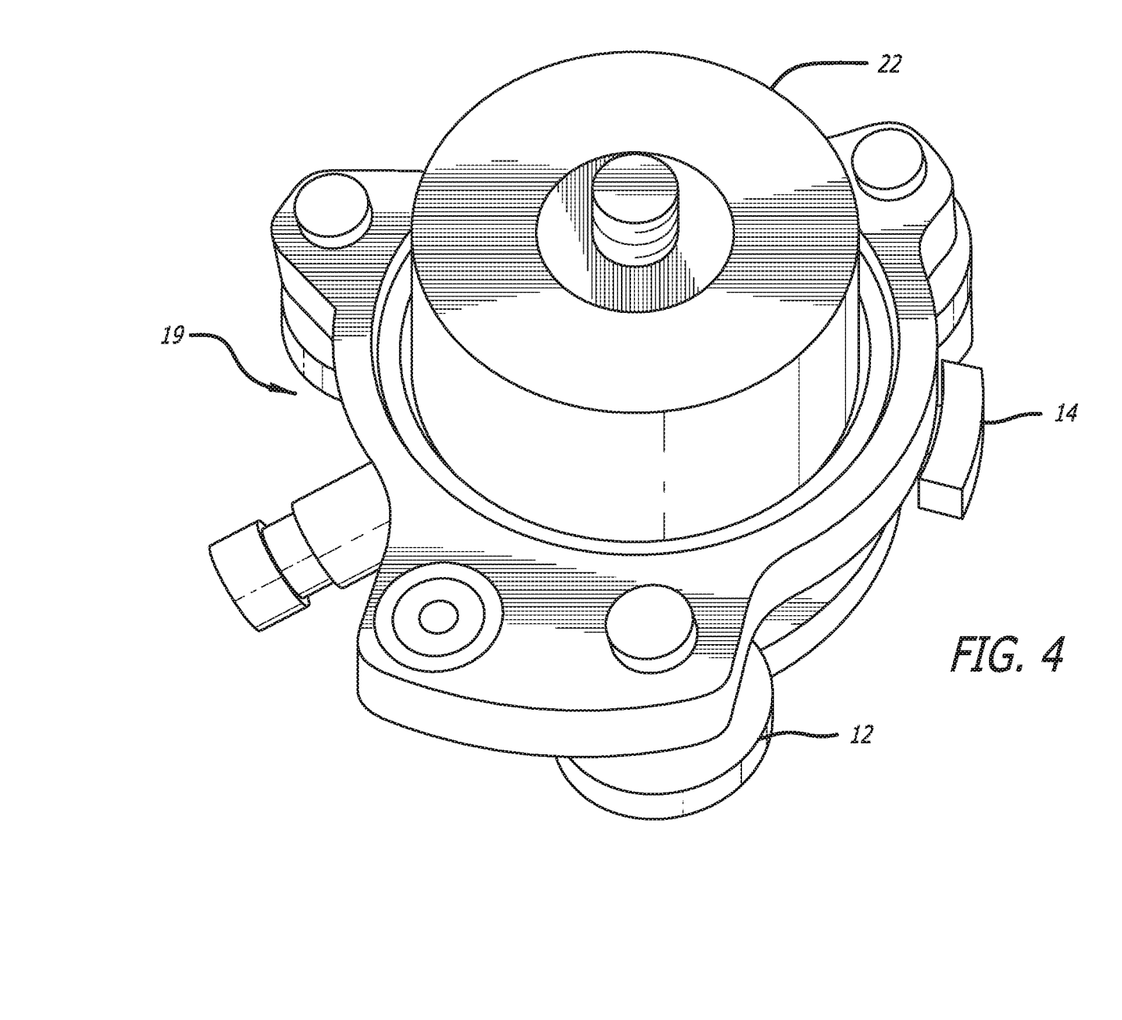
FIG. 4 is the rotating base in FIG. 3 attached to the level adjustable base in FIG. 2.
Figure 5:
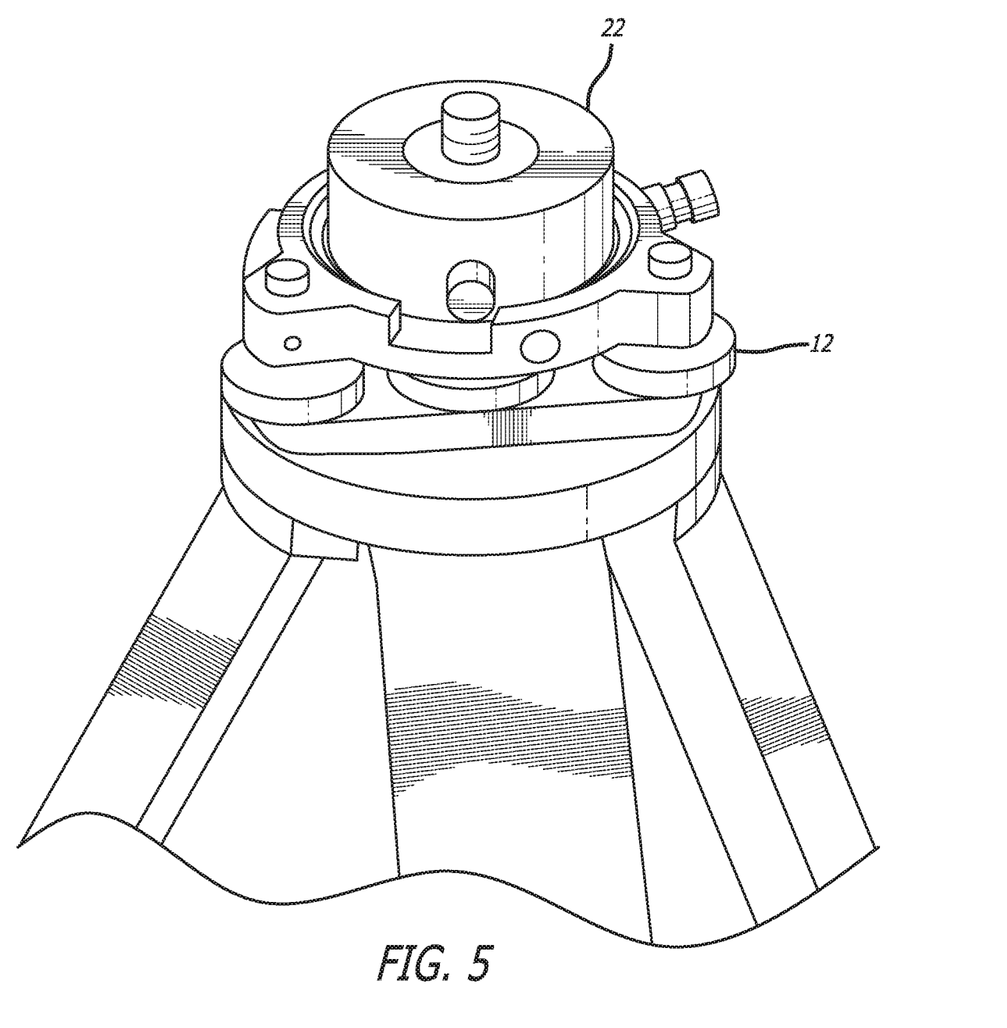
FIG. 5 is the items in FIG. 4 attached to tripod in FIG. 1.
Figure 6:
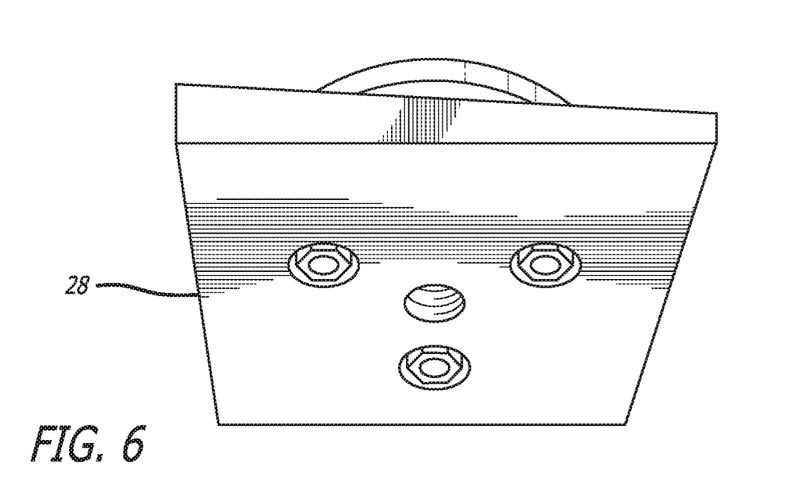
FIG. 6 is the bottom of angle plate with a rotatable base attached to the top angled side of the angle plate. The bottom side of the angle plate is attachable to the top of the earth leveled rotatable base in FIG. 5.
Figure 7:
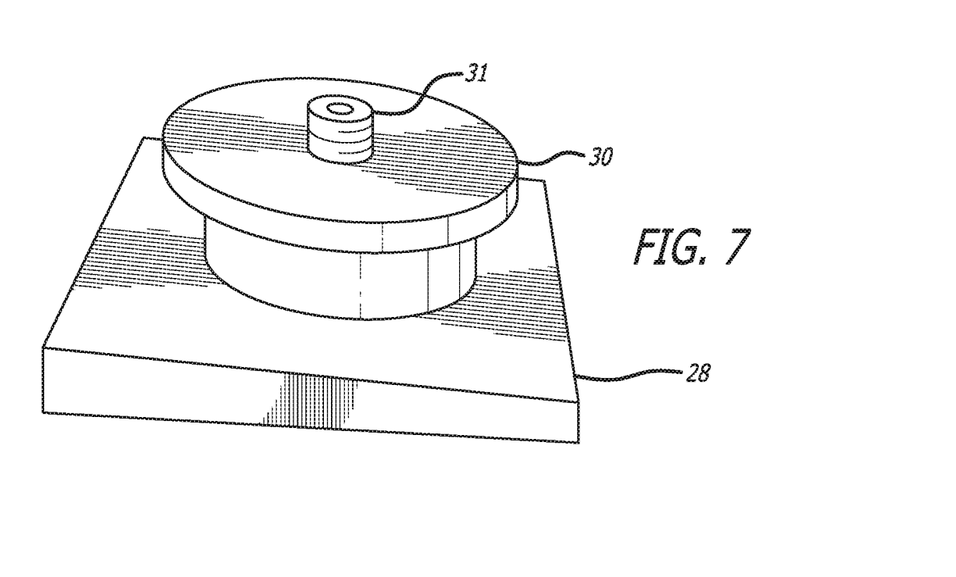
FIG. 7 is a side view of items in FIG. 6.
Figure 8:
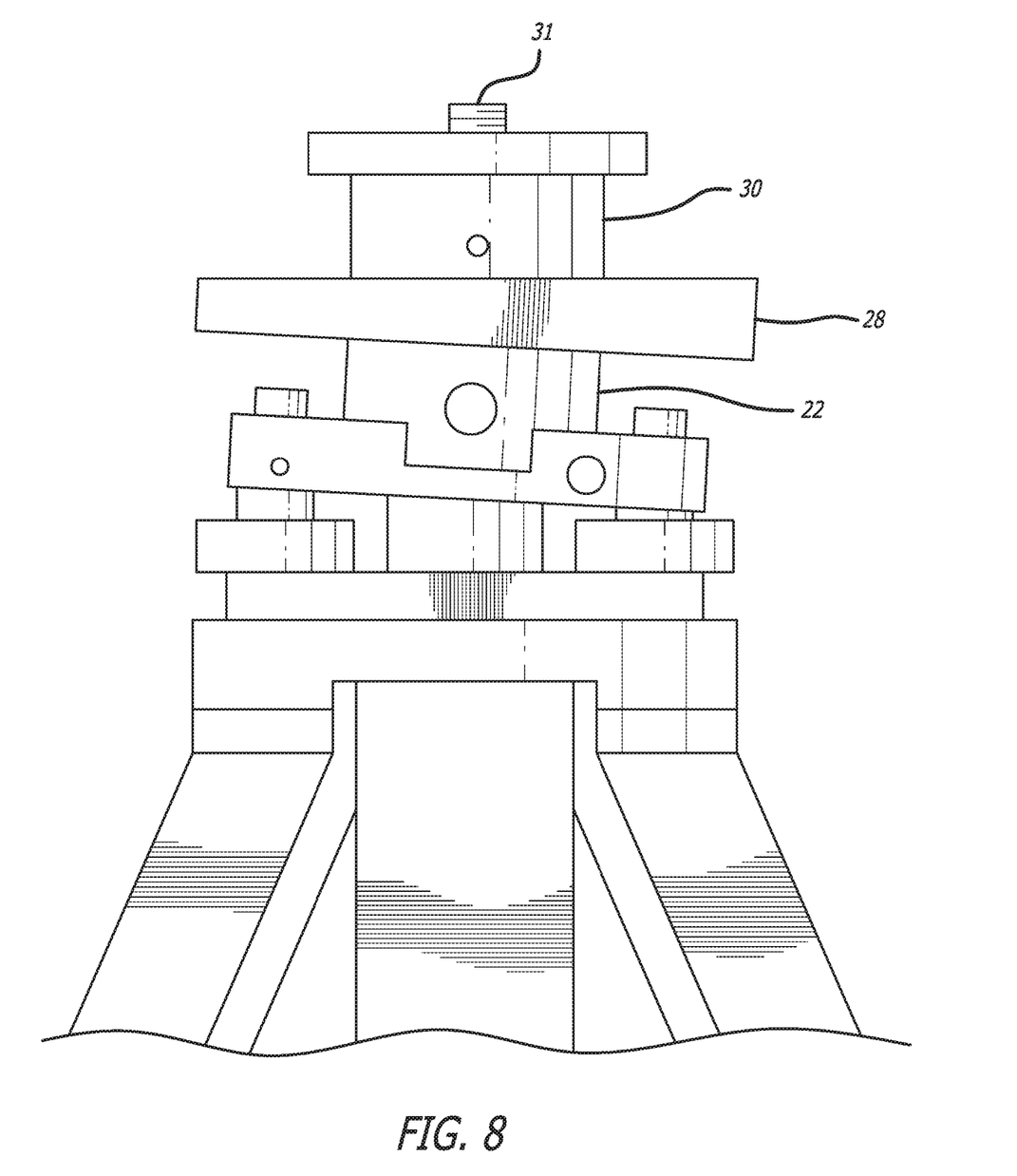
FIG. 8 is the components in FIG. 6 and FIG. 7 assembled on top of the components in FIG. 5.
Figure 9:
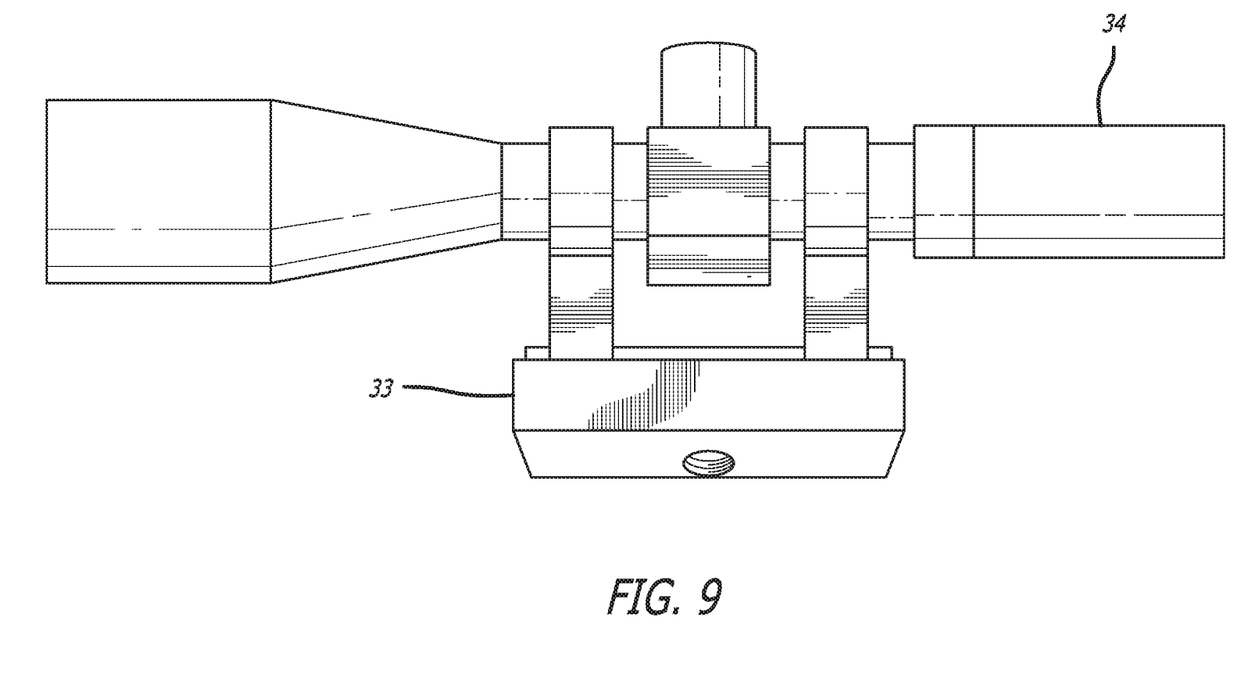
FIG. 9 is the sighting device or telescope (fixed or adjustable power and/or focus) attachable to the rotatable base in FIGS. 6 & 7.
Figure 10:
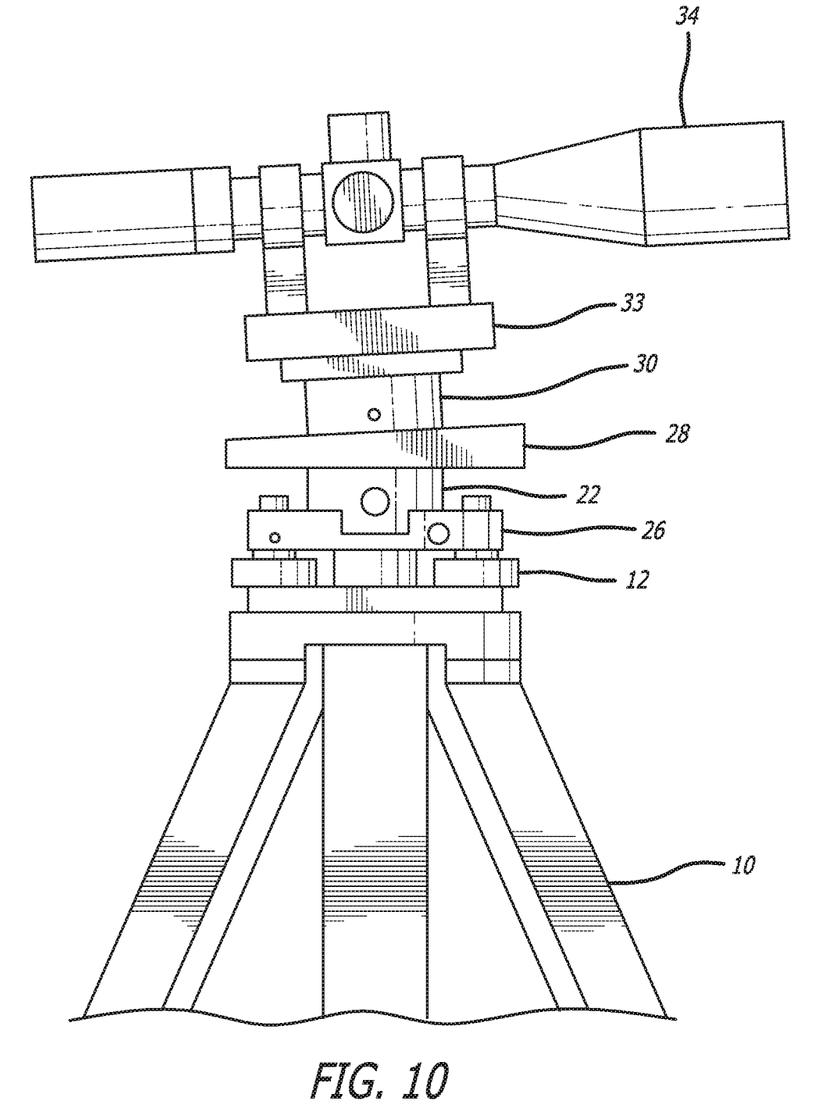
FIG. 10 is the sighting device in FIG. 9 attached to assembled components in FIG. 8.
Figure 11:
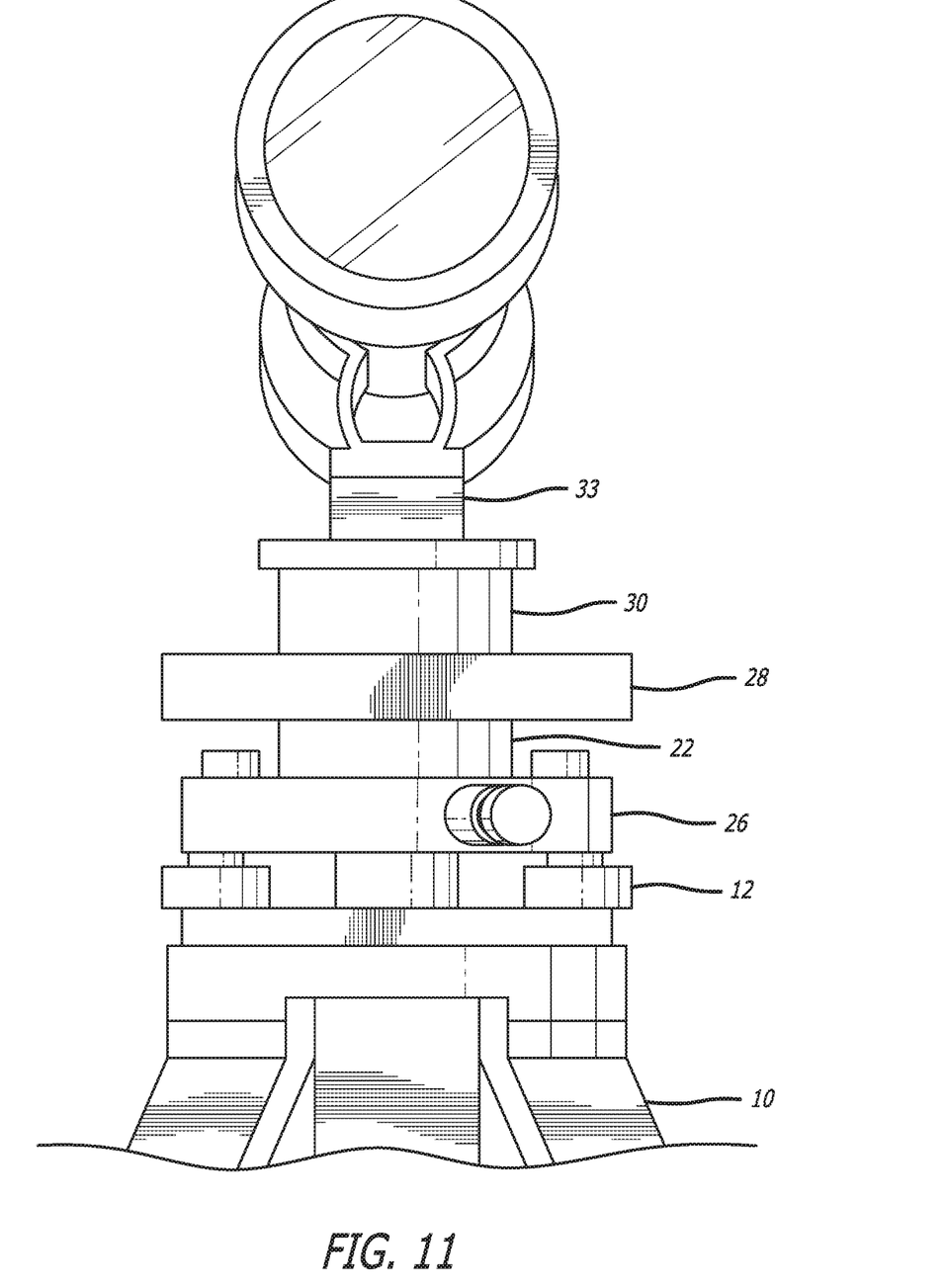
FIG. 11 is another view of the assembly components.

FIGS. 1-10 show the assembled hardware starting from the tripod top up. The tripod 10 is a standard surveyor's tripod available from a number of manufacturers. The one shown is from FLT—Florida Level & Transit. On top of the tripod 10 is the two part yellow mechanism with three black knobs 12, which is generically known as a tribrach 19. Tribrachs are available from several manufacturers through engineering and survey equipment distributors. The one shown is from Topcon, a major supplier in survey equipment. The bottom half 16 of the unit attaches to the tripod 10 or other base. The three black knobs 12 are used to adjust to earth level the top half 18 of the yellow device using the bubble level on the top part of the tribrach (See FIGS. 2 & 3). Tribrachs 19 accept accessories with three slotted posts into its locking device to attach various engineering and survey equipment. These units are interchangeable across manufacturers and the adapter, tribrach, rotating (round black unit shown in FIGS. 3 & 4 with the tribrach locks into the tribrach by the three brass legs 20 protruding from the rotating adapter 22. The rotating adapter units 22 used here are commonly employed to provide a rotatable platform, leveled to earth using the tribrach 19, onto which additional engineering or survey equipment can be mounted. The bottom portion of the rotating adapter (round black unit) is stationary relative to its mount and the top rotates freely but can be locked into a desired position using the brass locking knob visible in FIG. 5. The brass stud 31 and center section in FIG. 5 rotates on an internal bearing which supports whatever device is attached by the stud. FIGS. 6 & 7 show a precision angle plate 28 and a similar second rotatable device 30 affixed to the top of the precision angle plate 28. Both the rotatable tribrach 19 adapter supporting the angle plate 28 and the rotatable device 30 on top of the angle plate 28 are interchangeable, commercially available items (one is from Topcon and the other is from SECO, a different manufacturer).

FIG. 7 shows the brass stud 31 by which the bracket 33 supporting the sighting device 34 is attached. This particular second rotating adapter unit does not have a locking mechanism and the larger diameter knurled top portion rotates on a bearing concealed inside the unit. The precision angle plate 28 on top of the lowest rotating unit 22 and the sighting device 34 support bracket 28 on top of the upper rotating unit 30 are the only parts custom-made. All the rest are commercial items purchased from engineering and survey supply sources, except the sighting device which is a 3 to 9 power adjustable magnification rifle scope from Cabela's (hunting outfitters).

Dimensions of the components: Approximate dimensions are derivable from the relative size of the figures since the precision angle plate is custom made and it exactly 5×5 inches and ¾ inches thick on the thickest end and ½ at the thinnest end. The sighting scope is 12½ inches long. The scope mount bracket is custom made and is 5 inches long by 1 inch square. The tribrach is triangular in shape and fits in an approximate 4½ inch circle and is about 1⅞ inches high. The lower tribrach 19 rotating adapter body is about 3.115 in diameter by 1.365 inches high. The upper rotating tribrach adapter body is 3.115 in diameter and 1.260 inches high. The entire assembly from the bottom of the tribrach 19 to the top of the scope is approximately 8½ inches.

BRIEF DESCRIPTION OF THE DRAWINGS

FIG. 1 is the tripod or stand for remainder of device to be placed on.

OBJECTS OF THE INVENTION

It is an object of the present invention to provide an inexpensive device for determining the clear space;

It is another object of represent invention to provide a device that is easy to use to determine the clear space;

It is another object of the present invention to provide a device that is reliable to use to determine the clear space;

It is another object of the present invention to provide a simple method for determining the clear space;

These and other objects will be apparent for a review of the specification and accompanying drawings and photographs of this application.

DETAILED DESCRIPTION OF THE DRAWINGS

A platform (tripod or other base) supporting a device is capable of being earth leveled (tribrach), which in turn supports a rotatable and lockable turntable on which is mounted a precision angle plate with the bottom side parallel to earth. The precision angle plate can now be rotated with its bottom level to earth to establish the desired direction that the upper (angled) portion of the precision angle plate is to be pointed. One primary use is scanning a plane not parallel to earth level, but which rises at a specific angle relative to earth level to examine for ground based obstacle penetrations into that plane (ie: trees, structures or terrain). The specific plane envisioned is the floor of an Obstacle Clearance Surface (OCS) for an approach to an airport runway. The precision angle plate can be solid, as in this unit, or adjustable so as to be able to set it to different angles. By far the most commonly used angle is 20:1 (this means 1 unit of rise for 20 units of distance, which is what this plate is machined to). This particular plate is 5 inches square and is precisely 0.250 in. different in thickness from one edge to the other across the plate. The other OCS slopes used are 34:1 and 50:1 for approach slopes and 7:1 and 10:1 for side clearance slopes. The 20:1 slope is the MINIMUM federal OCS standard. The unit is set up so the sighting device is on or below the OCS at a given point. That level or height is easily established. It would typically be set a few feet below the OCS floor to allow for tree growth. Most all of the OCS penetrations are from trees. The precision angle plate is now rotated to be parallel to the incoming approach path and locked in position with the thicker edge of the precision angle plate at 180 degrees opposite the approach direction. Mounted to the top of the precision angle plate is the second rotatable base which supports the sighting device on a mounting bracket. The sighting device has been calibrated to sight level with its mounting bracket, so when rotated on the upper rotatable base, the cross hairs in the sighting device are following the OCS plane (or the set up offset parallel to and below the OCS plane).

The unit does not have to be set up on the runway center line and will track the same OCS or OCS offset plane if not in line with the runway at all, so long as the thick side of the precision angle plate is turned to and locked facing in the opposite magnetic direction as the inbound approach. This device does not track or define the lateral limits of the OCS planes, only the floor of the OCS plane. The lateral limits are defined by straight lines which need to surveyed and marked only once.

It is recognized that the location of the objects that would possibly constitute an obstruction in the clear envelope could be positioned by standard GPS technology and input into a memory chip located in the apparatus attached to the tripod. The chip would include orientation software so that the angle of the chip relative the ground would be determined and the clear space determined from the inputs from the GPS and input of the angle of the chip.

While the present invention has been described in detail with regards to the preferred embodiments, it is appreciated that other variations of the present invention may be devised which do not depart from the inventive concept of the present invention.

The invention claimed is:

1. A surveying instrument for determining a clear landing path for a runway approach and side clearances comprising:
   a support base having top and bottom planar surfaces the upper surface of which can be positioned parallel to the ground;
   a sighting support member having a bottom surface parallel to the top surface of the support base and a top surface being oriented at a selected non parallel angle in relationship to said planar surfaces of said support base;

a sighting mechanism mounted on said top surface of the sighting support member, the central axis of said sighting mechanism being parallel to the top planar surface of said sighting support member; and the sighting mechanism being rotatable around an axis perpendicular to the top surface of the sighting support member whereby the central axis of said sighting mechanism is maintained at a constant angle relative to the top planar surface of said support base so as to be used to determine a clear landing path and the side clearances, of the runway when rotated.

2. The surveying instrument of claim 1 in which the angle of said sighting support member is adjustable.

3. The surveying instrument of claim 1 in which the angle of the sighting support member is formed by the sighting support member having a slope of 7:1 or 10:1.

4. The surveying instrument of claim 1 in which the angle of the sighting support member is formed by the sighting support member having a slope of 20:1, 34:1 or 50:1.

5. The surveying instrument of claim 2 in which the slope of the sighting support member is formed by the sighting support member having a slope from 7:1 to 50:1.

6. The surveying instrument of claim 1 in which the sighting support member being rotatable around a vertical axis.

7. The surveying instrument of claim 1 in which said support base is mounted on a tripod.

8. The surveying instrument of claim 6 in which the legs of said tripod are adjustable.

* * * * *